June 6, 1967  A. SZERLIP  3,324,469
FREQUENCY DIVERSITY RADAR RANGING SYSTEM
Filed May 25, 1956  3 Sheets-Sheet 1
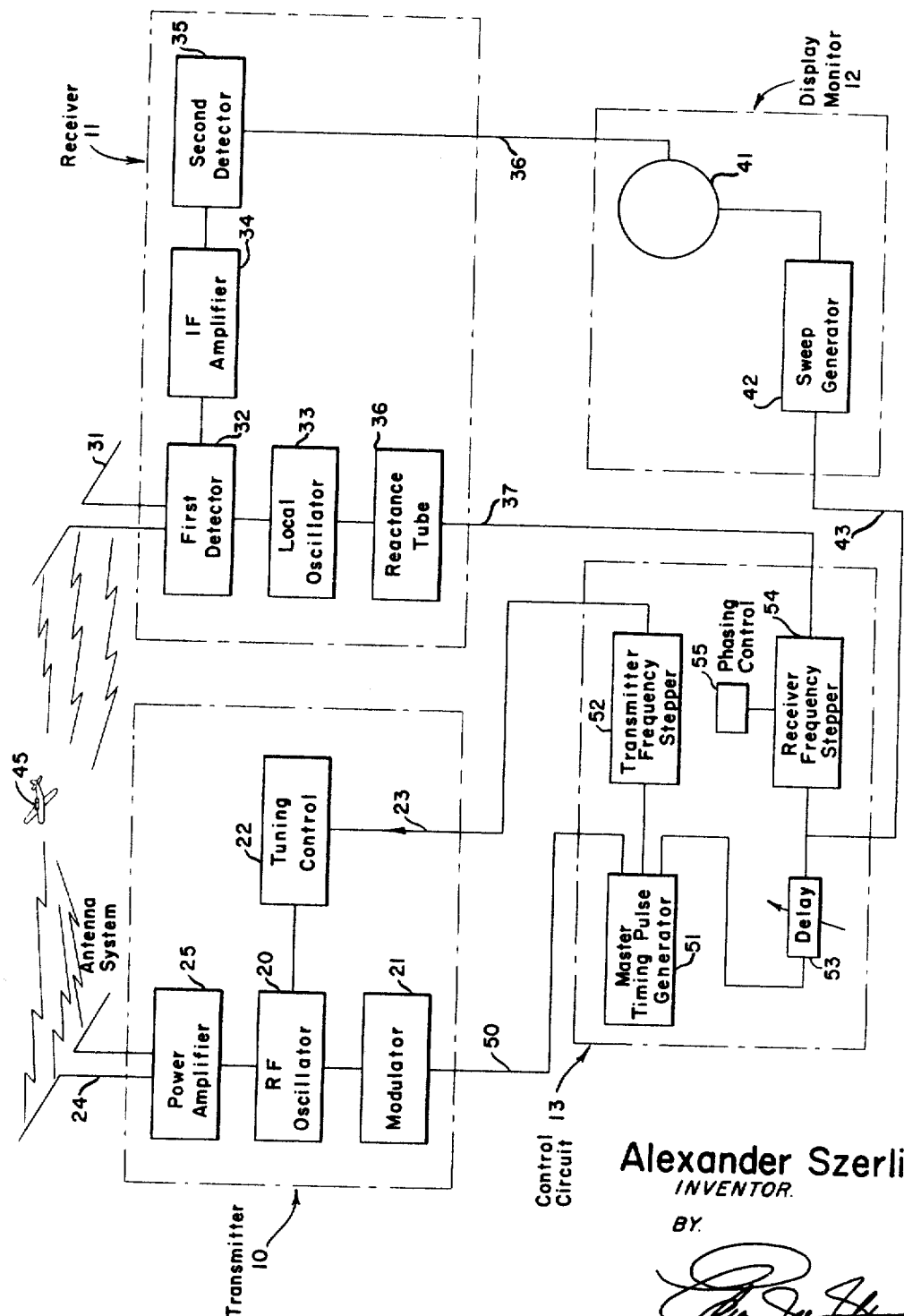
Fig. 1.
Alexander Szerlip,
INVENTOR.
BY
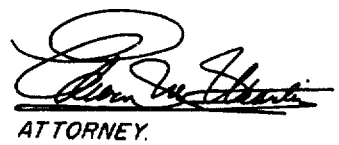
ATTORNEY.

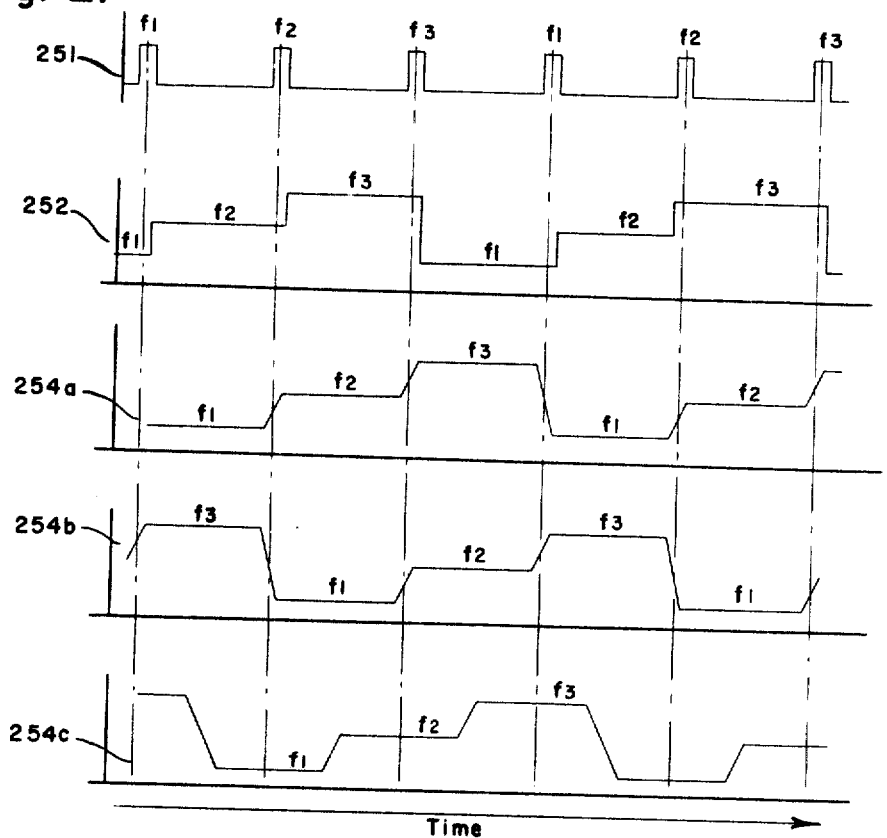
Fig. 2.
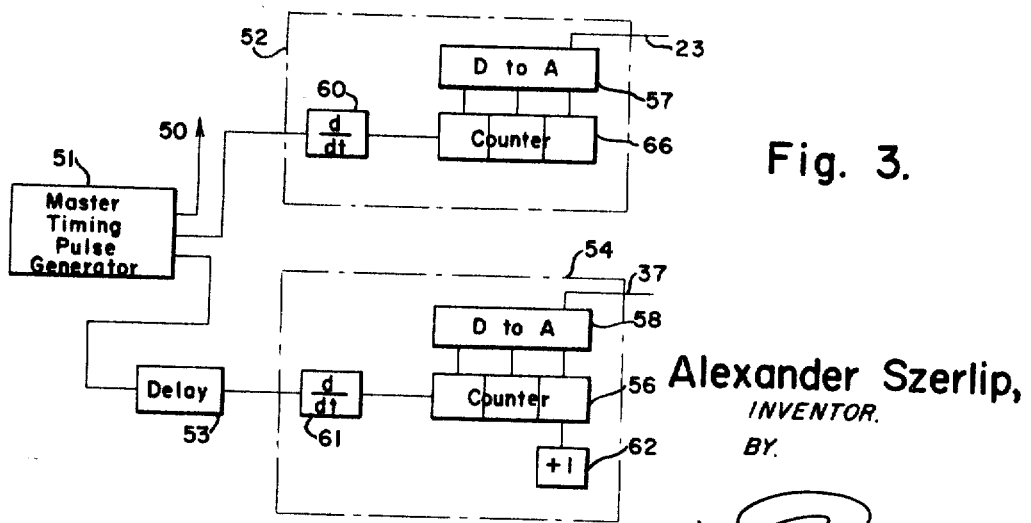
Fig. 3.
Alexander Szerlip,
INVENTOR.
BY.
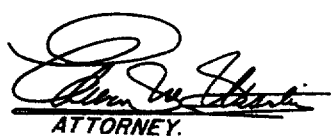
ATTORNEY.

June 6, 1967  A. SZERLIP  3,324,469
FREQUENCY DIVERSITY RADAR RANGING SYSTEM
Filed May 25, 1956  3 Sheets-Sheet 3
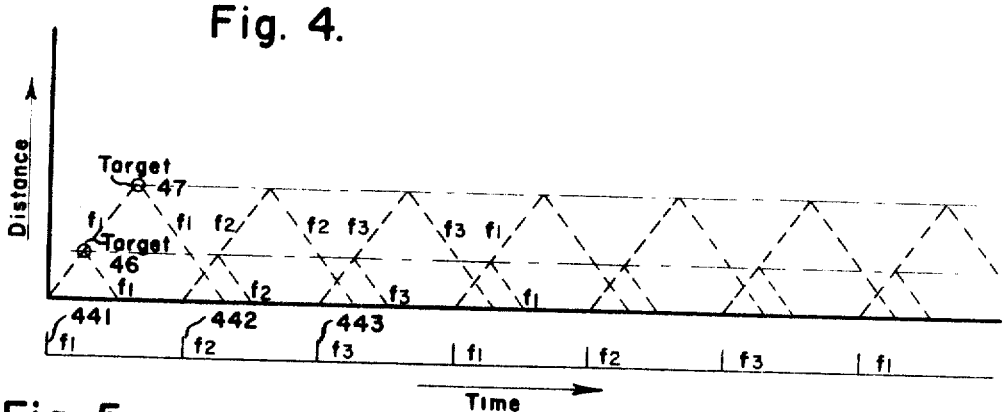
Fig. 4.
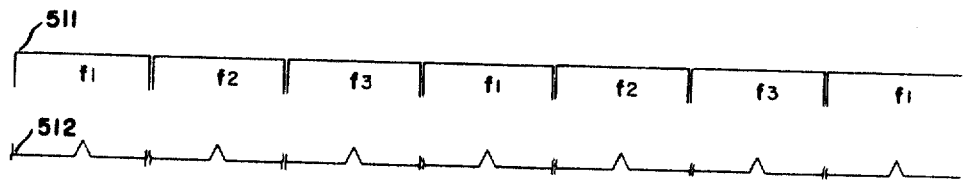
Fig. 5.
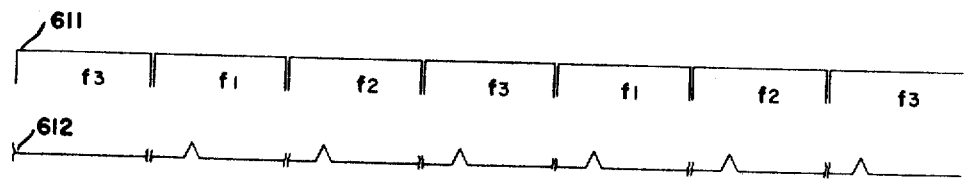
Fig. 6.
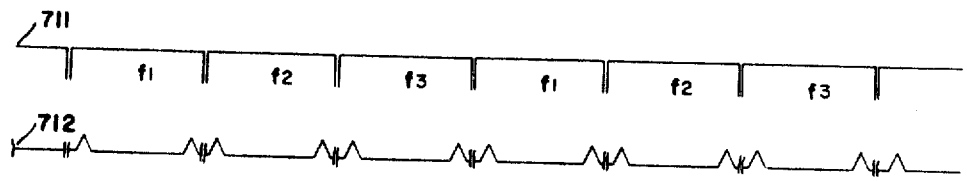
Fig. 7.
Alexander Szerlip,
*INVENTOR.*
BY
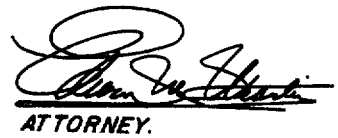
*ATTORNEY.*

United States Patent Office 3,324,469
Patented June 6, 1967

3,324,469
FREQUENCY DIVERSITY RADAR RANGING SYSTEM
Alexander Szerlip, Los Angeles, Calif., assignor to Hughes Aircraft Company, Culver City, Calif., a corporation of Delaware
Filed May 25, 1956, Ser. No. 588,206
10 Claims. (Cl. 343—17.2)

The present invention relates generally to systems for indicating the position in space of a radiated-signal reflector, and more particularly to a radar system for indicating the presence of targets in selected range sectors in space.

Conventional radar systems may be utilized to scan selected portions of space and locate objects by detecting the reflection of radio frequency energy therefrom. The determination of the space coordinates of located objects is ordinarily made by providing, in the case of angular azimuth and elevation, that the antenna system associated with either the transmitter or receiver have a restricted radiation pattern, while the range coordinate is ordinarily determined by measuring the time required for the transmitted energy pulses to return from the target. Since radar energy travels with a velocity equal to the speed of light, this time measurement may conventionally be expressed as distance by applying the appropriate conversion factor.

The art of directive antenna systems has been highly developed and accordingly a highly accurate determination may usually be made of the angular position of targets from which reflections are received.

On the other hand, the systems heretofore proposed for restricting scanning to a particular range interval suffer from a number of deficiencies which have prevented their widespread adoption. According to one class of prior art systems designed to receive echoes from targets located only in a selected range sector, means are provided within the receiver to disable the receiver during periods in which echo signals would normally be received from targets outside the selected range interval. Such a mode of receiver operation reduces the listening time of the receiver and accordingly results in a reduction of the overall efficiency of the system.

It is therefore an object of the present invention to provide an improved radar system for indicating the presence of radiated-signal reflectors or targets within selected intervals in space.

A further object of the present invention is to provide an improved radar system for indicating the presence of targets in a selected range interval where the selected range interval may correspond to any desired fraction of the maximum range of the radar, lying beyond any desired minimum range of the radar system.

Yet another object of the present invention is to provide a radio detecting and ranging system for indicating the presence of targets in selected range intervals wherein the receiver is continuously operable for receiving echoes from the selected range interval.

Another object of the present invention is to provide an improved radar system in which as high a pulse repetition rate as desired may be utilized without restricting the range of the radar system or introducing range ambiguity due to "second time around" echoes.

A radar system according to the present invention includes: a tunable radio frequency pulse energy transmitter, a tunable radio frequency energy receiver, and means for programming the tuning of the transmitter and receiver. In accordance with the invention, the frequency programmer for the transmitter sequentially tunes the transmitter to each of a plurality of discrete frequencies and provides pulsing means for pulsing the transmitter to radiate energy at each of the frequencies. The receiver frequency sequencing means is programmed to tune the receiver sequentially to each of the plurality of frequencies to which the transmitter is tuned, but also includes means for delaying the tuning of the receiver to each of the frequencies for an interval of time following the radiation of energy at such frequency. Where the sequences of frequencies employed for both transmission and reception correspond, the relative time displacement between the radiation of energy at a particular frequency and the tuning of the receiver to receive echo signals at the same frequency automatically establishes the portion of the range from which echo signals are received.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

FIG. 1 is a block diagram of a radar system in accordance with the present invention.

FIG. 2 is a graph showing curves which represent the signal waveforms in portions of the system of FIG. 1.

FIG. 3 is a block diagram illustrating an alternative mechanization of certain portions of the system of FIG. 1.

FIGS. 4, 5, 6, and 7 are graphs illustrating the operation of the system of FIG. 1.

Referring now to the drawings wherein like characters are used to refer to the same or similar components throughout the several figures, a radar system in accordance with the present invention comprises a tunable radio frequency pulse energy transmitter 10 operable for radiating pulses of radio frequency energy at each frequency of a plurality of preselected frequencies in a predetermined sequence; a tunable radio frequency receiver 11 operable for receiving echo signals at each frequency of the preselected plurality of frequencies; display means 12 connected to the receiver 11 for providing a display in accordance with received energy and means comprising control means 13 for operating the transmitter 10 to radiate energy at each of the preselected frequencies and for operating the receiver 11 to receive echo signals at each of the frequencies in the predetermined sequence for an interval of time corresponding to the range interval to be scanned. The control means 13 also includes delay means for delaying the tuning of the receiver to each frequency of the transmitted sequence for an interval of time corresponding to the desired minimum range of the range interval to be scanned.

More particularly, the transmitter 10 includes a radio frequency (RF) oscillator 20 adapted for producing pulses of radio frequency energy in response to driving pulses from a modulator 21. The frequency of the radiated pulse is determined by a tuning control 22. According to conventional practice, the tuning control 22 may be a reactance tube for controlling the tuning of the RF oscillator 20 in response to a transmitter frequency control voltage received over an input lead 23. Such voltage control tuning devices are well known in the art and accordingly further description is not considered necessary. Alternatively, RF oscillator 20, modulator 21 and tuning control 22 may comprise a single electronic device in which both the frequency and duration of the generation of radio frequency energy may be controlled by appropriate control signals. Where the energy generated by the RF oscillator 20 is of sufficient amplitude, it may be applied directly to an antenna system 24 for radiation in space, or alternatively, where the RF oscillator 20 operates at a comparatively low power level, the energy may be applied to the antenna system 24 through a power amplifier 25 to raise the level of the radiated signal. Antenna system 24 may be any of the conventional radar antenna systems and may be adapted to have any radiation pattern deemed desirable.

The tunable radiant energy receiver 11 includes an antenna system 31 for receiving reflected energy from targets disposed in space such as an airplane 45, and frequency selective detecting means for receiving the several transmitted and reflected frequencies and supplying detected reflected or echo signals to the display means 12. While the separate antenna 31 may be employed for the receiver 11, the transmitting antenna 24 may be used for both transmission and reception by duplexing in a well known manner. The receiver 11 includes a first detector 32 to which the receiver antenna 31 and a local oscillator 33 are connected. The detector 32 is responsive to the received RF energy and the output signal from the local oscillator 33 to produce an output intermediate frequency signal at a preselected intermediate frequency (IF). An intermediate frequency amplifier 34 is connected to the first detector 32 for receiving the IF signal and producing an amplified output signal, which is thereafter applied to a second detector 35 for detecting the received intermediate frequency signals and producing output video signals corresponding thereto. These output signals in turn are supplied to the display monitor 12 over an output lead 36.

In order to provide for the tuning of the receiver 11 in accordance with the present invention, which requires that the receiving frequency be shifted at a comparatively high rate, use may be made of variations of the signal generated by the local oscillator 33. This may be most readily accomplished by coupling a reactance tube circuit 36 across a frequency determining element of the local oscillator 33. The reactance tube circuit 36 should be of the class responsive to a voltage signal for varying its reactance, thereby varying the frequency of the oscillator. An appropriate receiver frequency control signal for the receiver 11 may be applied as a voltage level signal over an input lead 37.

The output video signals from the receiver 11 appearing on the output lead 36 are applied to the display monitor 12, and may be used to modulate the display appearing on a cathode ray tube 41 in a conventional manner. The time dependent aspect of the display is achieved by providing a sweep generator 42 which is connected to produce an output signal in response to a deflection control signal received from control circuit 13 over an input lead 43 and to apply an output signal to deflection control apparatus associated with the cathode ray tube 41. In accordance with conventional techniques, the output signal from the sweep generator 42 may be a sawtooth deflection waveform, in which case the display on the cathode ray tube 41 will be a function of time along one of its axes. Where a plan-position type of display is desired, the video signals received over the input lead 36 may be used to intensity modulate the pattern appearing on the cathode ray tube 41, while if an A type display is desired, the video signals may be used to modulate the displacement of the display on the cathode ray tube. Other representations well known in the radar art may be used if deemed desirable.

Since accurate synchronization of the various functions of the present system is highly desirable in order to achieve optimum performance, use is made of a master control circuit 13 to control the radiation of energy by the transmitter 10, to supply voltages for controlling the operating frequencies of the transmitter and receiver, to initiate the sweep for the display monitor 12 and to effect the proper time and sequence of shifts in the transmitting and receiving frequencies. As shown in FIG. 1, the control circuit 13 includes a master timing pulse generator 51 for generating a plurality of timing pulses including a plurality of pulses corresponding to the transmitter pulses at the desired pulse repetition rate. These pulses, appearing on an output lead 50 are applied to the modulator 21 of the transmitter 10 to pulse amplitude modulate the oscillator in a well-known manner.

The output pulses from the pulse generator 51 are also applied to a transmitter frequency stepper 52 and through delay means 53 to a receiver frequency stepper 54. Each of the steppers 52 and 54 is responsive to its applied input signals for cyclically producing output voltage level signals which are applied to the transmitter tuning control 22 and the receiver tuning control 34 over control leads 23 and 37, respectively, to control the transmitting and receiving frequencies.

In accordance with the present invention, the successive pulses of energy from the transmitter 10 are transmitted on a plurality of discrete frequencies in cyclical sequence. Such a cyclical shifting in frequencies may be most readily achieved by providing that stepper circuit 52 comprise a voltage level output signal stepping circuit responsive to applied input signals for cyclically producing a sequence of voltage level output signals including one level for each received input signal. The level of the output voltages produced by the stepper 52 should correspond to the voltage level control signals required by the tuning control 22 of the transmitter 10 to effect the tuning of the transmitter to the plurality of desired output frequencies from the transmitter. If the change of voltage level signals from voltage stepper 52 is made in response to the application of pulses from the master timing pulse generator 51, each successive pulse transmitted by the transmitter 10 will be at a different frequency, the total number of different frequencies utilized being determined by the number of pulses required to cycle stepper 52 through a complete sequence. For example, if stepper 52 is a three step counter, a sequence of three different frequencies will be produced by the transmitter. In order to prevent the shifting of frequencies from taking place during the transmission of a pulse from the transmitter 10, stepper 52 may be made responsive to change of its voltage level output signal at the trailing edge of the pulses from master pulse generator 51 in accordance with well-known practices.

Receiver frequency stepper 54 is similar to stepper 52, responding to applied input signals for cyclically producing a sequence of voltage level signals at its output. The number of voltage levels available from stepper 54 should correspond to the number of voltage levels produced by stepper 52, while the amplitude of each step should be selected to tune the receiver 11 to a frequency corresponding to one of the frequencies transmitted by the transmitter 11. The sequence of frequencies to which the receiver 11 is tuned should correspond to the sequence of frequencies transmitted by the transmitter 10. In order to utilize the system to its maximum efficiency, the listening period during which the receiver is tuned to each frequency should correspond to the interpulse interval between transmitter pulses. Since the receiver will ordinarily be disabled by radiated energy during the transmitter pulse interval, the shift in frequencies at the receiver may most conveniently be timed to take place during the transmitter pulse, and accordingly stepper 54 may be mechanized to respond to the leading edge of each of the rectangular pulses produced by the pulse generator 51.

While the sequence of frequencies on which successive pulses are transmitted and the sequence of frequencies to which the receiver 11 is tuned should correspond, the relative time between the periods when a pulse of a particular frequency is transmitted and the time when the receiver 11 is tuned to receive an echo signal of such frequency will determine the range interval from which signals will be received and displayed on the display monitor 12. In order to provide means for changing the relative phasing between the transmitted and received signals of a given frequency a delay means 55 is included in the control circuit 13. The delay means 55 should be arranged to delay the tuning of the receiver 11 to a particular frequency for a selected interval of time following the transmission of energy by the transmitter 10 at that particular frequency. This interval of time is readily recognized as corresponding to the minimum distance from which echo signals will be displayed and passed to the monitor 12. The duration of time for which the receiver is tuned to receive signals at particular frequencies is seen to determine the range interval for which echo or reflected signals are received and displayed. Since the receiver frequencies bear the same time relationship to each transmitted pulse, a corresponding display is produced for each transmitted pulse. It is readily recognized that the system imposes no limitations on the number of pulses per second which may be utilized by the transmitter. At the same time, since the receiver is ordinarily tuned to receive signals at each frequency for a period corresponding to one interpulse interval, the range interval available for display ordinarily corresponds to the interpulse interval.

The plurality of frequencies utilized in the system of the present invention may comprise any number of frequencies. Ordinarily, the number of frequencies utilized will be based on the consideration that in order to avoid second time around echoes from interfering with the proper identification of the range of targets detected, the receiver should not again be tuned to a particular frequency unless the pulse producing the echo signals can be uniquely identified. Thus, for example, if energy is transmitted at a particular frequency and the receiver tuned to that frequency at some later time, the same operating frequencies for the transmitter and receiver should not again be utilized until a time interval corresponding to the time required to transmit and receive echoes from the maximum range of the radar system has elapsed. Where it is desired to transmit pulses at a higher rate, a greater number of transmitting and receiving frequencies may be utilized or other second time around suppressing systems may readily be utilized with the present system.

A further understanding of the operation of system of FIG. 1 may be had by referring now to FIG. 2 where the output signal from the timing pulse generator 51 is shown as a plurality of substantially rectangular pulses depicted as waveform 251. These output pulse signals are applied to the modulator 21 of the transmitter 10 and accordingly the transmitter radiates a pulse of energy corresponding to each of the timing pulses. The timing pulses are also applied to the transmitter level stepper 52 which produces an output signal corresponding to a repeated staircase waveform as shown by the waveform 252. This output signal in turn is applied to the tuning control 22 and accordingly the transmitter is sequentially tuned to a frequency corresponding to the voltage level of each step of the waveform 252. The waveform 252 is seen to include three different voltage levels and accordingly the successive pulses from the transmitter will be produced at three different frequencies. The number of frequencies utilized in the present system may be any number and accordingly the number of steps in each cycle of waveform 252 may be any number. Similarly, while the waveform has been depicted as staircase in form, such a waveshape of output signal is not mandatory and the sequence of voltage levels may be arranged in any desired manner. The pulses from timing generator 51 also cause the receiver voltage level stepper 54 to produce output signals which are depicted in the figure as waveforms 254(a)–(c) for various settings of the delay means 53. For convenience of illustration, the waveforms 254(a)–(c) are shown as identical in shape to waveform 252, it being understood that the voltage levels at each step of the waveshape are selected to tune the receiver to a frequency corresponding to a particular transmitted frequency. Ordinarily, in fact, the correspondence depicted in the figure would not be present as the receiver would ordinarily require a signal amplitude to tune the receiver to particular frequencies which is different from that required to tune the transmitter to the same frequency. In each of waveforms 254(a)–(c) it has been assumed that a particular amplitude of output signal tunes the receiver 11 to one transmitter frequency and thus it is seen that each of the waveforms corresponds to different phase relationships between the transmitter operating frequencies as depicted in waveform 252 and the receiver frequencies. Thus for waveshape 254(a), it is assumed that the receiver is tuned to the transmitter frequency of the pulse transmitter immediately before the receiver listening period, i.e., interpulse interval. In waveshape 254(b) the output of the receiver frequency stepper 54 is displaced one pulse interval with respect to that depicted in waveshape 254(a), while in waveshape 254(c) the receiver listening period for a particular frequency is shown as being displaced less than one interpulse interval following the transmitter pulses of the same frequency. The shifts in phaseal relationship depicted in FIG. 2 may readily be achieved in accordance with well known electronic techniques by appropriate adjustment of the delay means 53 of FIG. 1 or by means of a pulse count adder 62 of FIG. 3, to be described more fully hereinafter.

Referring now to FIG. 3, there is shown a portion of the control circuit 13 of FIG. 1 illustrating the mechanization of the voltage level steppers in accordance with digital computer techniques. As shown in the figure, the circuit includes a master timing pulse generator 51, which may be a conventional blocking oscillator of appropriate design. The output pulses from the pulse generator 51 are applied to the transmitter 10 over an output lead 50 and to the voltage steppers 52 and 54, respectively. Each of voltage steppers 52 and 54 includes a binary counter 66 and 56 and a digital-to-analogue converter 57 and 58, respectively. Each of counters 52 and 54 is mechanized to have a maximum count corresponding to the desired number of frequencies to be utilized in the system of the present invention and is responsive to pulses from the pulse generator 51 for changing the count stored in the counter. The digital-to-analogue converters 57 and 58 are connected to each of counters 66 and 56 respectively and are responsive to the count stored in each of the counters for producing a corresponding voltage level output signal. The amplitude of the analogue signal produced by the count need not correspond in amplitude to the analogue equivalent of the count in the counter, but should instead be selected to correspond to the voltage level required to tune the transmitter 10 or the receiver 11 to a desired operating frequency. Each of counters 66 and 56 is arranged to receive input signals from the generator 51 through differentiating networks 60 and 61, respectively. The differentiator 60 is arranged to produce output pulses corresponding to the trailing edge of the pulses from generator 51, while the differentiator 61 is arranged to produce output pulses corresponding in time to the leading edges of the timing pulses. The pulses applied to differentiator 56 may be further delayed by means of a variable delay line 53, where it is desired to shift the receiver frequencies less than one interpulse interval.

A particular advantage in the use of the circuit of FIG. 3 for mechanizing the control circuit 13 is that alterations in the relative phasing of the transmitting and receiving frequencies may conveniently be realized by altering the count stored in one of the counters. If the counters and their digital-to-analogue converters are arranged to tune the transmitter 10 and the receiver 11 to the same frequency when both counters are registering the same count, a similar relationship of identity will be maintained between the frequencies as the counters move through their count cycles. If an additional count is now introduced into one of the counters, such as by means of a count adder 62 the same sequence of frequencies will be maintained, while at the same time achieving an automatic time displacement of corresponding frequencies by a period of time established by the difference in counts between the two counters. Since specific structure for mechanizing the control system depicted in FIG. 3 are well known in the digital computer art, it is considered that further description of the specific circuits is not necessary. Where it is desired that the time difference between the tuning of the transmitter to a particular frequency and the tuning of the receiver to the same frequency be less than one full interpulse interval, use may be made of the delay line 53 between the pulse generator 51 and stepper 54 to delay the application of pulses from the pulse generator and thereby delay the shifting of frequencies in the receiver. If desired, the delay line 53 may be made variable in order to provide a variable time difference, where it is desired that the minimum target range be variable.

In accordance with the present invention, the plurality of frequencies at which the transmitter transmits pulses of energy and to which the receiver is tuned may comprise any suitable or desired frequencies. Ordinarily, the difference between the frequencies should be such as to cause no interference in the receiver when tuned to a particular frequency from echo signals received at other transmitted frequencies. It is obvious that the choice of frequencies will be determined in the first instance by the band width of the receiver. A narrow band width receiver permits the use of closely spaced frequencies while a broad band receiver requires the use of frequencies displaced more broadly. Similarly, where the receiver 11 is mechanized as a superheterodyne receiver, it is highly desirable that interference from image frequencies be prevented. Such interference may conveniently be avoided by appropriate choice of frequencies in a manner well known in the art.

The display monitor 12 as heretofore described receives video input signals from the receiver 11 and time sweep initiating signals from the control circuit 13 and produces a display corresponding in appearance to that produced on conventional radar monitoring screens. Where the changes in receiver frequency occur simultaneously with the transmission of pulses by the transmitter 10, the sweep generator 42 of the monitor 12 may be initiated by the pulses produced by the master timing pulse generator 51. Preferably, the sweep produced by the generator 42, under such conditions, should have a duration corresponding to one interpulse interval, in which case the echo signals received during each successive interpulse interval will appear as super-imposed images on the face of the cathode ray tube 41. Where the stepping of frequencies by the receiver frequency stepper 54 is timed to occur during the interpulse interval, the sweep should preferably be initiated simultaneously with the shifting of frequency at the receiver in order to avoid the production of a faulty display. In either case, the range of particular target echo signals may conventionally be determined by means of pulse timing techniques will known in the radar set.

Referring again to the figures, there is shown in FIGS. 4, 5, 6 and 7, diagrams illustrative of the operation of the system of the present invention when programmed in accordance with the waveforms shown in FIG. 2. In each of the figures, time is depicted along the abscissa. FIG. 4 is designed to illustrate the operation of the transmitter, while FIGS. 5, 6 and 7 illustrate the operation of the receiver 11 and the display monitor 12, when the control circuit 13 is programmed in accordance with waveshapes 254(a) through (c), respectively.

More particularly, in FIG. 4, time is depicted along the abscissa of the diagram, while distance is depicted along the ordinate. Thus, radar energy, either transmitted or reflected, forms a trace in the figure at an angle to both the horizontal and vertical axes. As shown in FIG. 4, the transmitter 10, in response to signals from the control circuit 13, produces a plurality of radio-frequency (RF) pulses 441, 442 and 443, displaced in time in accordance with the pulse rate of the generator 51 and at frequencies established by the frequency stepper 52. If the frequency stepper 52 is mechanized to produce an output signal corresponding to the waveform 252 depicted in FIG. 2, each of pulses 441, 442 and 443 will be produced at frequencies $f_1$, $f_2$ and $f_3$. This cycle of frequencies will be repeated as long as the operation of the transmitter is maintained. These transmitted pulses will be reflected from a near target 46 and a far target 47 and returned to the transmitting site after a delay in time corresponding to the distance the energy has traversed. As shown in the figure, the relationship of range between the near and far targets 46 and 47 is such that the echoes from both targets are received substantially simultaneously in order to illustrate the range discrimination capabilities of the present invention. Were such a target distance relationship present in a conventional radar system, there would ordinarily be no means available to discriminate between the targets and identify them as two widely separated targets.

However, if the tuning of the receiver is programmed in acordance with waveform 254(a), the receiver will be tuned to a frequency corresponding to the frequency of the transmitted pulse immediately after each transmitter pulse and will be maintained at such frequency for a duration corresponding to the interpulse interval, as depicted for waveform 511. Since the receiver will only pass echo signals corresponding to the frequency for which it it tuned, it is readily recognized that only echoes from the near target 46 will be passed by the receiver and appear on the display monitor. The echoes from the far target 47 produced by the transmitter pulses will be received during intervals in which the receiver is tuned to a frequency other than the transmitter frequency producing the echo and accordingly will not be passed and displayed on the display monitor. Successive sweeps of the cathode ray tube 47 under such a mode of operation are as depicted in waveform 512. The range of the display target may conveniently be determined in a well-known manner. The waveform 512 is also illustrative of the fact that while the receiver is blind to target echoes from the far target 47, and indeed for all target echoes from the greater portion of the radar range, an echo signal corresponding to each transmitter pulse will be received and displayed for targets present in the target range corresponding to the interpulse interval immediately following the transmitter pulse. Thus the receiver is never blocked to the receipt of echo signals and the system is seen to operate at maximum efficiency throughout. If the cycling of frequency stepper 54 is now established to produce waveform 245(b) the receiver tuning cycle will correspond to waveshape 611 of FIG. 6, wherein it is seen that echo signals from the far target 47 are now received and displayed on the receiver monitor, while at the same time echo signals from the near target 46 are suppressed. The resulting display, as shown in waveshape 612, includes only information from the far target 47. While the target echoes shown in each of waveforms 512 and 612 bear the same relationship to the start of each sweep cycle, it is apparent that the distance to each target is different, since the receiver in each case is programmed to receive echoes from a different range interval.

In FIG. 7 the operation of the system with the receiver programmed in accordance with waveshape 254(c) is depicted. As shown by waveshape 711, a delay corresponding to less than an interpulse interval is introduced by the delay line 53 to correspond to a range intermediate to that of the near target 46 and the far target 47. If it is assumed that the shift in the operating frequency of the receiver takes place at a sufficiently high rate, echo signals from both the near and far targets 46 and 47 will be received and displayed on the display line as shown by waveshape 712. Waveshape 712 discloses a time displacement between the echo signals from each of the near and far targets 46 and 47 corresponding to the true distance between the targets. Thus, despite the fact that echo signals from the two targets are returned to the receiver at substantially corresponding instants in time, it is nevertheless possible, in accordance with the present invention, to display and determine the true spatial relationship of the two targets.

While the means for displacing the receiver frequency sequence with respect to the transmitter frequency sequence has been shown and described as a delay means for delaying the changing of frequencies at the receiver, it will readily be recognized that a mode of operation identical to that shown and described may be achieved, where a cyclical sequence of frequencies is employed, by incorporating the sequence displacing means in the transmitter frequency changer. Thus, for example, in FIG. 1 delay means 53 may easily be introduced between pulse generator 51 and transmitter frequency stepper 52. Similarly in FIG. 3, the count adder 62 may be incorporated in the transmitter frequency stepper 52 as a count adder or subtractor.

There has thus been described a radar system for indicating the presence of targets in a selected range sector, in space where the selected sector corresponds to any desired fraction of the range of the radar system lying beyond any desired minimum range.

What is claimed as new is:

1. A radar system comprising an antenna, oscillator means for supplying pulses of radio frequency energy to said antenna, tuning means coupled to said oscillator for controlling the frequency of said pulses, a timing generator coupled to said oscillator means to control the timing of said pulses, a transmitter frequency stepper coupled to said timing generator for receiving timing control and coupled to said tuning means to cause said oscillator means so successive pulses are radiated from said antenna at each frequency of a sequence of predetermined frequencies, a tunable receiver for receiving echo signals after being radiated from said antenna, reactance means coupled to said tunable receiver for controlling the frequency of reception of said echo pulses, a time delay means coupled to said timing generator, and a receiver frequency stepper coupled to said delay means for receiving timing signals and coupled to said reactance means for controlling the tuning of said tunable receiver so as to periodically change the tuning frequency from one to another frequency of said sequence of predetermined frequencies.

2. A ranging system for scanning selected range intervals in space and receiving echo signals from targets disposed within the selected interval comprising a transmitter operable for sequentially radiating pulses of energy into space at each one of a plurality of discrete frequencies, a receiver operable for receiving echo signals of said pulses of energy radiated into space by said transmitter at each of said plurality of discrete frequencies, means for operating said transmitter and receiver, including a transmitter and a receiver frequency sequencing means coupled respectively to said transmitter and receiver for operating said transmitter and said receiver in the same sequence of discrete frequencies, said receiver frequency sequencing means including variable delay means for delaying the operation of said receiver at each discrete frequency of said sequence with respect to the operation of said transmitter at the same frequency of said sequence.

3. A system comprising a pulse transmitting means sequentially operable for radiating into space a pulse of energy at each frequency of a preselected plurality of frequencies, receiving means sequentially operable for receiving echo signals of said pulses of energy at each of said preselected plurality of frequencies, master timing means, transmitter frequency control means coupled between said master timing means and said pulse transmitting means, variable phasing means coupled to said master timing means, and receiver frequency control means coupled between said phasing means and said receiving means, said variable phasing means displacing the receiving sequence with respect to the transmitting sequence.

4. A radar system comprising a pulse transmitter including a tuning control means operable for radiating pulses of radio frequency energy toward a target in space at each frequency of a selected sequence of a plurality of frequencies, a timing means, a transmitter frequency stepper coupled between said timing means and said tuning control means to control said sequence of a plurality of frequencies, tunable receiving means for receiving echo signals of said radiated pulses after reflection from said target, a receiver frequency stepper coupled between said timing means and said tunable receiver means for sequentially tuning said receiving means to receive echo signals at each of said frequencies in said predetermined sequence, and time delay means coupled between said receiver frequency stepper and said tunable receiver means for establishing a time delay between the time of radiating pulses at a particular frequency and the tuning of the receiver to receive echo signals at said particular frequency.

5. A radar system for indicating an object in space comprising radio frequency transmitting means including a modulator and a tuning control means and operable for radiating a pulse of radio frequency energy at each of a preselected plurality of frequencies in a predetermined sequence, a master timing pulse generator coupled to said modulator for controlling the timing of said pulses of radio frequency energy, a transmitter frequency stepper coupled between said master timing pulse generator and said timing control means for controlling said transmitting means for radiating pulses of energy at said preselected plurality of frequencies in said predetermined sequence, radio frequency receiving means operable for receiving echo signals of said pulses at each of said preselected plurality of frequencies, variable delay means coupled to said master timing pulse generator, a receiver frequency stepper coupled between said variable delay means and said radio frequency receiving means for rendering said receiving means operable to receive said echo signals at each of said frequencies in said predetermined sequence at a preselected instant in time following the operation of said transmitting means as determined by said variable delay means, and display means coupled between said variable delay means and said receiving means for providing an indication of the object in space.

6. A radar system comprising a radio frequency pulse transmitter including tuning means and operable for radiating pulses of radio frequency energy at each frequency of a selected plurality of frequencies in a predetermined sequence, radio frequency receiving means operable for receiving echo signals from an object in space at each of said preselected plurality of frequencies, a timing pulse generator coupled to said pulse transmitter for controlling the time of radiating said pulses of energy, a transmitter frequency stepped coupled between said timing pulse generator and said tuning means of said transmitter for controlling the selected plurality of frequencies of said radiated pulses, a variable delay means coupled to said timing pulse generator, and a receiver frequency stepper coupled between said variable delay means and said receiving means for rendering said receiver operable to receive echo signals at each of said frequencies in said predetermined sequence.

7. A system comprising pulse transmitter means operable for sequentially radiating pulses of energy toward objects in space, means coupled to said pulse transmitter means for controlling said transmitter means to be operable at each frequency of a sequential plurality of frequencies, receiving means operable for sequentially receiving the radiated pulses after being reflected from said objects in space, means for controlling said receiver means to be operable at each frequency of said sequential plurality of frequencies, pulse generator means coupled to said means for controlling said transmitter means for modulating said radiated pulses, said pulse generator means generating timing pulses, a first counter coupled between said pulse generator means and said means for controlling said transmitter means for determining said sequential plurality of frequencies, a second counter coupled between said pulse generator means and said means for controlling said receiver means so as to determine said sequential plurality of frequencies at which said receiving means is operable, and count changing means coupled to said second counter to change the time of occurrence of said operable frequency of said receiving means in said sequence relative to the operable frequency of said transmitter means.

8. A system comprising a pulse transmitter operable for sequentially radiating pulses of high frequency energy into space, first control means coupled to said transmitter for varying the frequency characteristics of said transmitter to radiate said pulses of high frequency energy into space at a sequential plurality of frequencies, said first control means including a modulator, a receiver operable for sequentially receiving said pulses after being radiated into space by said transmitter at each of said plurality of frequencies, second control means coupled to said receiver for varying the frequency characteristics of said receiver to receive said pulses at said sequential of said receiver to receive said pulses at said sequential plurality of frequencies, pulse generator means coupled to said second control means to control the timing of said pulses, a first digital counter coupled to said pulse generator means, first converter means coupled between said first digital counter and said first control means to control said first means so that said transmitter radiate pulses at a different one of said plurality of frequencies at each count, a second digital counter coupled to said pulse generator means, second converter means coupled between said second digital counter and said second control means to cause said receiver to receive pulses at a different one of said plurality of frequencies at each count, and a count adder coupled to said second counter to add counts thereto, thus varying the time of occurrence of said operable frequency of the sequence of said receiver relative to the operable frequency of the sequence of said transmitter.

9. A system comprising a pulse transmitter operable for sequentially radiating pulses of high frequency energy into space, means coupled to said transmitter and controllable for varying the frequency characteristics of said transmitter to radiate said pulses of high frequency energy into space at each one of a plurality of frequencies in a 'predetermined sequence, a receiver operable for sequentially receiving said pulses after being radiated into 'space by said transmitter at each of said plurality of frequencies, means coupled to said receiver and controllable for varying the frequency characteristics of said receiver to receive said pulses at each one of said sequential plurality of frequencies, pulse generator means coupled to said transmitter for controlling the pulse formation of said radiated pulses of energy, first differentiating means coupled to said pulse generator means, a first digital counter coupled to said first differentiating means, a first digital-to-analogue converter coupled between said first digital counter and said means for varying said transmitter, variable delay means coupled to said pulse generator means, second differentiating means coupled to said variable delay means, a second digital counter coupled to said second differentiating means, a second digital-to-analogue converter coupled between said second digital counter and said means coupled to said receiver, and a count adder coupled to said second digital counter for developing a desired time displacement of corresponding frequencies between said transmitter and said receiver.

10. A radar system for receiving echo signals from objects in space at selected range intervals comprising radio frequency transmitting means including a modulator and a tuning control means and operable for radiating a pulse of radio frequency energy at each of a preselected plurality of frequencies in a predetermined sequence, a master timing pulse generator coupled to said modulator for controlling the timing of said pulses of radio frequency energy, a transmitter frequency stepper coupled between said master timing pulse generator and said tuning control means for controlling said transmitting means for radiating pulses of energy at said preselected plurality of frequencies in said predetermined sequence, radio frequency receiving means operable for receiving echo signals of said pulses at each of said preselected plurality of frequencies, variable delay means coupled to said master timing pulse generator for selecting the range interval, and a receiver frequency stepper coupled between said variable delay means and said radio frequency receiving means for rendering said receiving means operable to receive said echo signals at each of said frequencies in said predetermined sequence at a preselected instant in time following the operation of said transmitting means as determined by said variable delay means, thus receiving echo signals from objects in space only at said selected range intervals.

References Cited
UNITED STATES PATENTS

| | | | |
|---|---|---|---|
| 2,461,144 | 2/1949 | Cook | 343—17.1 |
| 2,490,808 | 12/1949 | Hoffman | 343—17.2 |
| 2,522,367 | 9/1950 | Guanella | 343—17.1 |
| 2,525,328 | 10/1950 | Wolff | 343—5 |
| 2,741,762 | 4/1956 | Page | 343—11 |
| 2,862,203 | 11/1956 | Skaraeus et al. | 343—5 |
| 2,884,627 | 4/1959 | Rateliffe | 343—5 |

RODNEY D. BENNETT, *Primary Examiner.*

NORMAN H. EVANS, FREDERICK M. STRADER,
*Examiners.*

D. R. SMALL, G. J. MOSSINGHOFF, J. P. MORRIS,
*Assistant Examiners.*